United States Patent [19]
De Cristofaris et al.

[11] Patent Number: 5,172,374
[45] Date of Patent: Dec. 15, 1992

[54] ACCESS PROTOCOL FOR ULTRA-WIDE COHERENT OPTICAL LOCAL NETWORK FOR MANAGING VARIOUS KINDS OF TRAFFIC

[75] Inventors: Gianfranco De Cristofaris; Franco D'Ignazio, both of Pomezia, Italy

[73] Assignee: Alcatel NV, Amsterdam, Netherlands

[21] Appl. No.: 549,371

[22] Filed: Jul. 6, 1990

[30] Foreign Application Priority Data

Jul. 6, 1989 [IT] Italy ............................... 21112 A/89

[51] Int. Cl.⁵ ............................................. H04L 12/44
[52] U.S. Cl. .................................. 370/94.3; 359/118; 359/120; 359/121
[58] Field of Search .................... 370/94.3, 85.1, 85.6; 340/825.5; 359/118, 120, 121

[56] References Cited

U.S. PATENT DOCUMENTS 4,813,012  3/1989  Valeri et al. .................... 340/815.31

FOREIGN PATENT DOCUMENTS 255442  2/1988  European Pat. Off. .

OTHER PUBLICATIONS

"Broadband Local and Metropolitan Area Networks in an IBCN Environment", S. Treves, Ninth International Conference on Computer Communication, Oct. 1988, pp. 373-378.

*Primary Examiner*—Douglas W. Olms
*Assistant Examiner*—Wellington Chin
*Attorney, Agent, or Firm*—Ware, Fressola, Van Der Sluys & Adolphson

[57] ABSTRACT

The present invention relates to a UCOL-type star network, comprising a central unit or passive star center and a plurality of depending stations intercommunicating via two-way optical fiber link channels, in which an access protocol generated by the stations linked to the star center shows a frame structure cyclically repeating every millisecond, and is shared in at least three parts where in the first one, informations related to frame beginning are idividuated, in the second one informations related to priority queues status are individuated, which informations allow to determine which station has access to the network, and are inherent to priority classes allowing to manage the various kinds of synchronous and asynchronous traffic, as well as a third part in which there is the information content to be transmitted, the whole under a constant control on data flow synchronism, in order to avoid a mutual data overlapping and to allow the sending of various kinds of traffic on the same channel, upon initialization of each station with an own time information depending on its distance from the star center.

13 Claims, 2 Drawing Sheets

ACCESS PROTOCOL FOR ULTRA-WIDE COHERENT OPTICAL LOCAL NETWORK FOR MANAGING VARIOUS KINDS OF TRAFFIC

BACKGROUND OF THE INVENTION

1. Field of the Invention

The present invention relates to a UCOL-type star network for the optimal management of various kinds of traffic and more particularly to a UCOL-type star network having a central unit or passive star center and a plurality of depending stations connected via two-way optical fiber channels, with said stations communicating through an access protocol having a frame structure.

2. Description of the Prior Art

As it is known, in the art of communications management in a network, where there are several transmitting stations, it is important to determine the access priorities of each station to the network itself, and then to the resources thereof, so as to avoid collision between the information packets generated by the various stations.

Relative to ultra-wide coherent optical local networks, hereinafter UCOL networks, such a problem is particularly prominent due to their particular characteristics concerning topology, technical features and types of offered services.

A typical UCOL network is configured as a passive star where each station is connected with its star center via two dedicated optical fibres. One fibre serves for transmission from the station to the star center and the other one for reception.

Each optical fibre is capable of to a multiple transmission channel.

The particular kind of optical fibre link using the coherent optics technology, allows that different channels be multiplexed through frequency division and used for several transmissions along the same fibre, thus optimizing the link resources.

As concerns the management of the access of each station to the network, the known access protocols do not fit the needs for effective management of access by each station with a UCOL network. Moreover, although access protocol systems using a priority concept are already available, at the present state of the art they appear to be intrinsically very complicated as to frame structure. For such reason they cannot satisfy the functional characteristics of a UCOL network and cannot optimize the resources therein contained.

This is due to the fact that the trend of the ideal management of access disputes to network resources, during the transmission of the various data coming from the various stations, is not well defined in the prior art.

SUMMARY OF THE INVENTION

An object of the present invention is to eliminate the drawbacks of the prior art and to provide a UCOL network able to meet all the mentioned requirements by using new access protocol features which resolve access dispute the resources of typical UCOL network and optimize the network resources, as well as to be able to transmit simultaneously, along the same channel and through cell transmission, both synchronous and packet traffic.

This object is achieved by using stations which assume initial time information which is characteristic of each station and a function of its distance from the star center. The stations are able to generate their own access protocol, wherein each frame is presented in a sequential fashion and cyclically repeated in time with a duration fixed and structurally divided into several time parts, in which it is possible to individuate informations concerning the beginning of the frame, the priority queues status to determine the access to the network of the stations data, and the priority classes corresponding to various kinds of traffic, as well as the informative contents to be effectively transmitted by each station, once a synchronism information of data flow, cyclically transmitted by one of the stations, has obtained the consent for transmitting the informative data contents.

From an operative point of view, such a network can operate both with synchronous and asynchronous traffic, by using the same channel (reference is made to packet and synchronous traffic as an example).

Moreover, with such a network it is possible to avoid the collision between data flows, being able to provide for the errors due to information on the measurement of distance between the station and the star center, and it is possible to prepare the information for transmission, knowing a transmission advance time which depends on the information propagation delay along the optical channel in addition to the measured distance between the station and the star-center.

Finally with such a network it is possible to classify into to priority classes, the kind of traffic to be managed.

DESCRIPTION OF THE DRAWINGS

The invention will now be described in detail next herein, by way of an example, with reference to the attached drawings.

DETAILED DESCRIPTION OF THE PREFERRED EMBODIMENT

Figure 1:
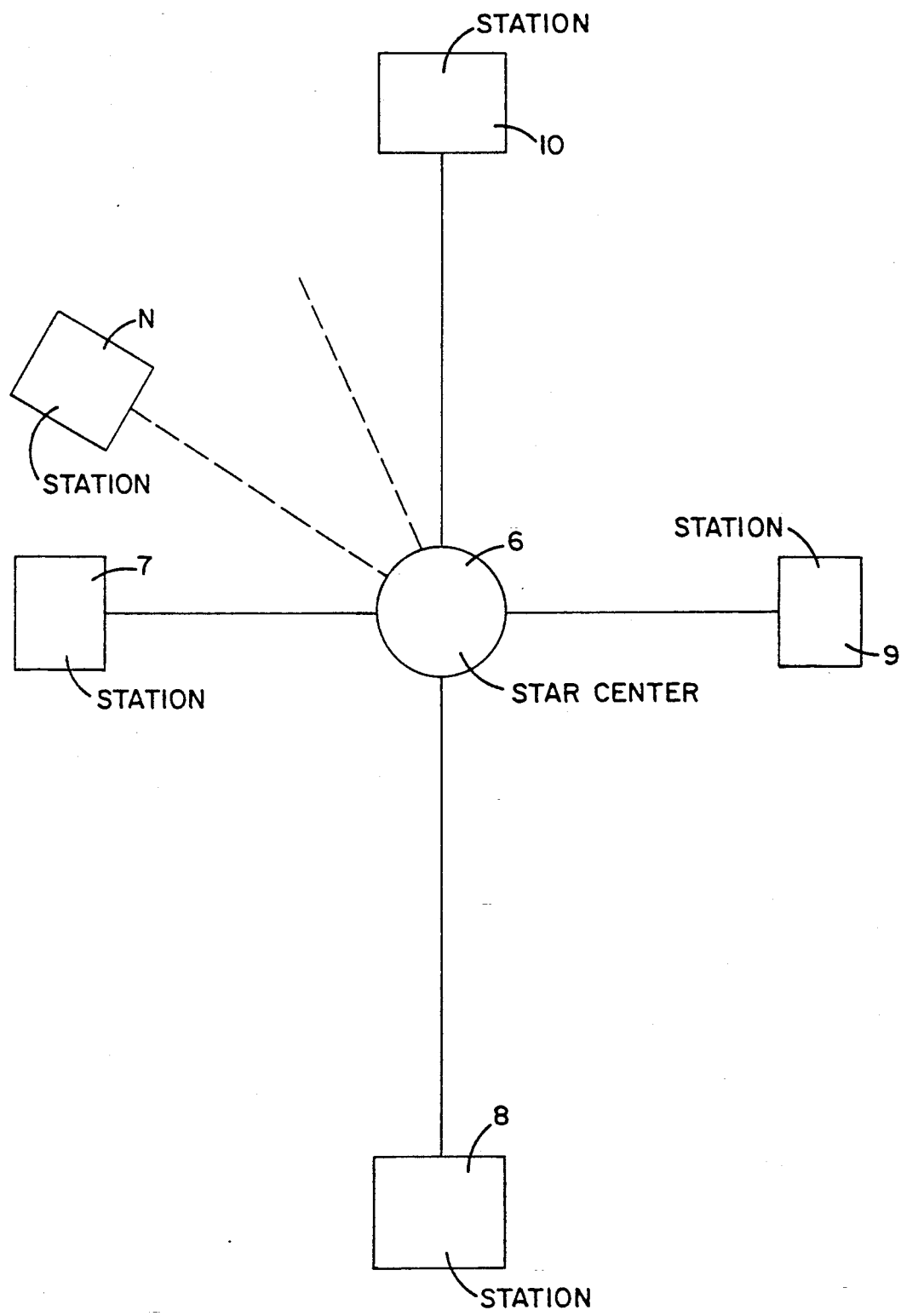
FIG. 1 shows a UCOL network schematically illustrated.
Figure 2:
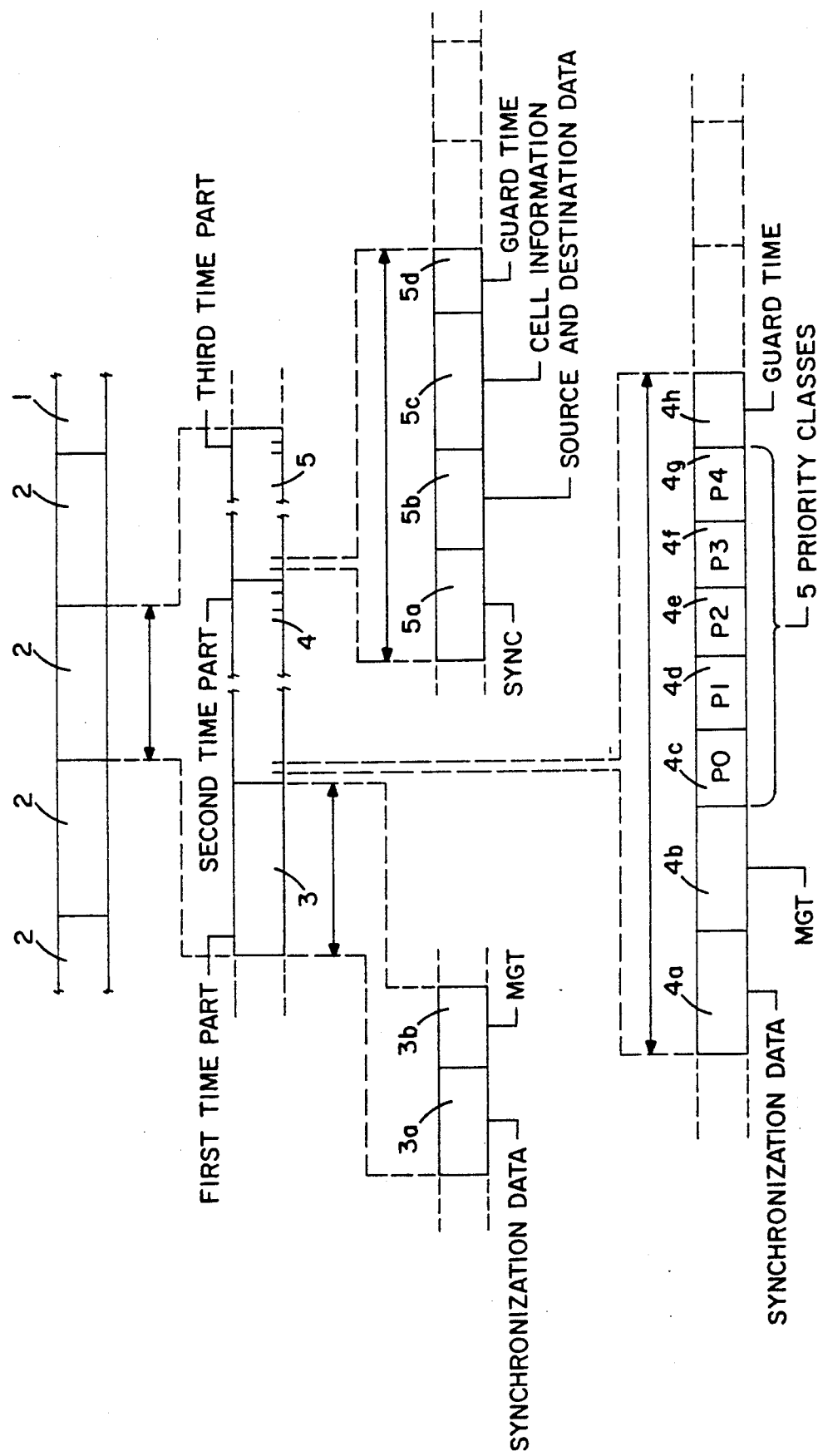
FIG. 2 shows a frame structure of the access protocol of the UCOL transmission network, according to the present invention.

Generally a UCOL network is considered as a multi-channel network. For the purpose of describing the invention, the access protocol described hereinafter is referred only to one channel, but can be implemented on more than one channel.

In an ideal situation a UCOL network has a continuous data flow, controlled by the access protocol from the stations 7, 8, 9, 10 . . . N to the star-center 6 without data packets colliding with each other thus destroying of their contents.

The access protocol, according to the present invention, provides for the subdivision of each channel 1 into frames 2.

In one embodiment, each frame has a millisecond duration in the transmission channel. Each frame 2, according to such an access protocol, includes three parts. A first part 3 has information related to the frame beginning. A second part 4 has information about the status of data access queues from the various stations. A third part 5 has data information contents from the various stations.

Each of these parts is, in turn, subdivided into sections having a well defined number of bytes.

The first part 3 of the frame, specifically, comprises 48 bytes and is subdivided in two sections 3a and 3b. The section 3a contains information related to a frame beginning. The section 3b contains a field called GUARD TIME related to a time approximately evaluated as 50 nanoseconds which provides for measurement errors related to time information concerning the measurement of distance between a station and the star center 6. A more detailed explanation will be given below regarding collision avoidance among the data blocks.

Part 4 of frame 2, related to queues status, has a first section 4a, for the synchronization of data flow from the stations, which acts for discriminating several blocks transmitting in synchronism. Part 4 also has a section 4b, called MGT (MANAGEMENT), which is an additional section whose information acts for providing new communication channels for distributed networks upon new requests from management of the network itself.

Part 4 also has five more sections 4c, 4d, 4e, 4f, 4g, as indicated in figure by P0 to P4, which represent five priority classes related to access priority for data coming from the stations to the star center, used for selecting data access of a station with respect to the others, as a function of transmission priority, i.e. of wait time. This is done to conform the synchronous traffic treatment modes to the packet traffic treatment mode, taking into account that synchronous traffic has a higher priority than packet traffic. All the above mentioned traffics are thus managed by information related to corresponding priority classes.

In one embodiment, a higher priority class has a lower priority number, i.e. class 0 represents the highest priority. Moreover class 0 is exclusively reserved for synchronous traffic, while the other ones are reserved for further priorities. Each priority class has two bytes for quantizing the priority intrinsic value and which in any case represents, as priority class, a number proportional to the maximum time the information transmitted by a station, meant as data quantity, must wait before its transmission. Normally, this time decreases as the wait time increases and, when it reaches the maximum priority and is not transmitted, the packet is abandoned.

In part 4 according to access queues status in the frame, it is decided which of the packets must be transmitted with the subsequent frame.

In a preferred embodiment, the number of stations is 64, so there are 64 subparts, each structure as part 4 just described from 4a to 4h.

Also in part 4, at the end of the five priority classes, there is a GUARD TIME field, in that case indicated by 4h, having the same purposes of the previous one, namely 3b.

Each of the 64 subparts of part 4, configured as hereinbefore described, contains totally 28 bytes.

For the synchronization, 16 bytes are needed, while for section 4b, 2 bytes are needed; on the contrary, for each priority class, 2 bytes are necessary.

Finally, part 5 related to the format of data information is structured in various sections. Section 5a has information for synchronism, as previously discussed regarding in section 4a. Section 5b contains information characterizing both the source and the destination of the information contents and the information beginning. At the end, section 5c has cell information which is closed by GUARD TIME field 5d. The whole part 5 can contain 200 subparts, each structured in the same manner as part 5, from 5a to 5d, just illustrated and provided with 88 bytes for each of 200 subparts.

Of these 88, 16 bytes are used for synchronization, 3 bytes for identifying the terminal station and for having a spare for eventual applications not foreseen and, of the remaining bytes, 64 are used for the real information, also in conformity with the rules nowadays in use, and 5 for providing a further beginning of real intrinsic information part.

Obviously, information pertaining to more than one of such 200 subparts, can be grouped together so as to provide a single information concept.

After each frame has been prepared and after each station is enabled to send its informations, the entire network will have its map of information cells wherein each station will have priorities characterized by priority classes 4c to 4g.

All this occurs upon initialization of each station with an own time information depending upon its distance from the star center.

Indeed, each station sends initially its own signal toward the star center, waiting for its return. In this way it is possible for each station to get the initialization time information, which value corresponds with the distance of the station from the star center. In substance, said time information characterizes an advance time for the transmission of data information contents, which time begins when allowed by the synchronism information and the priority class and lasts for a period corresponding exactly to propagation delay of the information along the link optical channel and depends on the effective measured distance between the station and the star center.

The bytes present in the various sections of the various parts 3, 4, 5 provide a data set which, travelling along channel 1, avoids collisions among data coming from the various stations, optimize the channel sharing through the one millisecond time, and allow to provide an information on the status of accesses through queues status 4.

Moreover, cell transmissions can also be sent, as just mentioned, both in case of synchronous traffic and packet traffic.

Such a protocol structure for network access can be easily implemented because it can be subdivided into further frame shares without any difficulty. Besides, the frame structure is particularly simple and does not imply any complication neither of bytes or further subparts burden.

The basic concepts of the network subject of the present invention can be summarized, on the one hand, in the initialization of stations according to their distance from the star center and, on the other hand, in the frame sharing into three parts 3, 4, 5, which provide together a plurality of characteristic informations, the access queues status, as well as the possibility of cell transmission, which make such type of protocol specific for UCOL networks. Indeed, such networks have the particular star topology, as well as particular technical aspects such as distance and station number parameters, and the aforementioned services such as, inter alia, the possibility of managing simultaneously, on the same channel, both the synchronous traffic and the packet traffic.

Relatively to the UCOL network described in the present invention, the number of useable optical channels has been fixed equal to 24.

It must be specified that the maximum number of stations linkable to the star center via optical channels should never exceed thirty kilometers, since such parameters should largely influence the network performances.

Obviously, other improvements and developments are also possible, all falling within the inventive sphere of the present invention.

We claim:

1. An ultra-wide coherent optical local star network which manages various kinds of traffic, having a star center unit and a plurality of depending stations up to a maximum number N, where N is an integer greater than one, each of said stations connected via two-way optical fiber channels, each of said stations communicating in accordance with an access protocol comprising a frame of data, wherein each of said stations of said star network is assigned a respective initialization time which is a function of its distance from the star center unit, and each frame being generated in a sequential fashion and cyclically repeated in time with a fixed duration and structurally divided into several parts, each frame having at least three time parts including a first time part having a section with data identifying a beginning of the frame, a second time part having sections with data identifying priority queues to determine access to the network of a station with respect to the other stations in each section having priority classes corresponding to various kinds of traffic, as well as a third time part of data with information transmitted by each station.

2. A star network according to claim 1, wherein each of said respective initialization time includes an advance time for the transmission of the frame of data, which the advance time being determined by synchronism information and by priority class and corresponding exactly to the propagation delay of the frame along the link optical channel and depends on the effective distance measured between a respective one of the plurality of stations and the star center unit.

3. A star network according to claim 1, wherein the number of said priority classes is equal to the various kinds of traffic which can be managed by said network.

4. A star network according to claim 1, wherein the data with information is transmitted in cell modules.

5. A star network according to claim 1, wherein the first time part has a first section with data determining the beginning of the frame, and another section containing a further field, called G.T. (GUARD TIME), to provide for the errors related to the information about the measurement of the distance between a respective station and the star center unit;

the second time part has a maximum number of subparts equal to the number of stations that can form part of said network, each subpart with a section containing data related to data flow synchronism, a series of sections containing data about priority classes and the status of the priority queues, and a final section containing a further field of aforesaid G.T. type; as well as the third time part has a plurality of subparts, each with a section containing data about data flow synchronism, a section assigned to data information and a final section containing a further field of aforesaid G.T. type.

6. A star transmission network according to claim 5, wherein in each subpart of the second part there is also a further section, called MGT (MANAGEMENT) containing an information representing an additional section, which provides new transmission channels upon new demands in network management.

7. A star transmission network according to claim 5, wherein in each subpart of third part there is also a further section containing the information related to the source of the data information transmitted with the cell module.

8. A star network according to claim 5, wherein each subpart of the second part has a number of bytes equal to 28.

9. A star network according to claim 5, wherein each subpart of the third part has a number of bytes equal to 88, 69 of which belonging to informative module cell.

10. A star network according to claim 5, characterized in that the first part contains a total number of bytes equal to 48.

11. A star transmission network according to claim 1, wherein a fixed repetition time of the frame is of one millisecond.

12. A star network according to claim 1, wherein the first part contains a total number of bytes equal to 48.

13. An ultra-wide coherent optical local network for optimal management of various kinds of traffic comprising:

a central communication node;

a plurality of stations connected via a pair of optical fiber channels to a central communication node;

each station being initialized by the central communication node depending on its distance from the central communication node;

one of the plurality of stations transmitting synchronization information to the central communication node to obtain consent to transmit data information;

each station communicating with the central communication node by frames of information that each station is able to generate in a sequential fashion and cyclically repeated in time with a duration fixed and structurally divided into three parts having information formatted as an access protocol, including (1) a first part having frame-beginning information, (2) a second part having status information about the data access queues, which determines the access to the network of each station with respect to its data and priority classes corresponding to various kinds of traffic, and (3) a third part having data information to be transmitted by each station;

the first time part further having a first section containing said data related to frame beginning, and another section containing a first guard field to provide for the errors related to the measurement of the distance between station and the central communication node;

the second time part further having a predetermined number of subparts equal to the number of stations manageable in said network, each subpart with a section containing data related to synchronism, a management section containing data related to the transmission of new channels added to the network, a series of sections containing data related to priority classes, and a final section containing a second guard field which functions similar to the first guard field; and the third time part further having a plurality of subparts, each with a section containing data related to synchronism, a section assigned to data information, and a final section containing a third guard field which functions similar to the first and second guard fields.

* * * * *